United States Patent
Harwood et al.

(10) Patent No.: US 11,669,315 B2
(45) Date of Patent: Jun. 6, 2023

(54) CONTINUOUS INTEGRATION AND CONTINUOUS DELIVERY PIPELINE DATA FOR WORKFLOW DEPLOYMENT

(71) Applicant: EMC IP Holding Company LLC, Hopkinton, MA (US)

(72) Inventors: John S. Harwood, Boston, MA (US); William Jeffery White, Plano, TX (US); Said Tabet, Austin, TX (US); Robert Anthony Lincourt, Jr., Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 180 days.

(21) Appl. No.: 17/381,469

(22) Filed: Jul. 21, 2021

(65) Prior Publication Data
US 2023/0028146 A1 Jan. 26, 2023

(51) Int. Cl.
*G06F 8/60* (2018.01)
*G06F 11/36* (2006.01)

(52) U.S. Cl.
CPC ............ *G06F 8/60* (2013.01); *G06F 11/3664* (2013.01); *G06F 11/3684* (2013.01); *G06F 11/3688* (2013.01)

(58) Field of Classification Search
CPC .................... G06F 11/36–3696; G06F 8/60
See application file for complete search history.

(56) References Cited

U.S. PATENT DOCUMENTS

| | | | |
|---|---|---|---|
| 8,533,676 B2* | 9/2013 | Watters | G06F 11/3664 717/106 |
| 10,802,951 B2* | 10/2020 | Falko | G06F 11/323 |
| 2013/0174117 A1* | 7/2013 | Watters | G06F 8/71 717/106 |

* cited by examiner

*Primary Examiner* — Todd Aguilera
(74) *Attorney, Agent, or Firm* — Chamberlain, Hrdlicka, White, Williams & Aughtry

(57) ABSTRACT

Techniques described herein relate to a method for using pipeline data for deploying workflows. The method may include determining that a pipeline testing trigger occurred for a workflow; decomposing a pipeline testing manifest of the workflow; generating a testing execution plan using the decomposed workflow; adding instrumentation to the testing execution plan; determining that the instrumented testing execution plan is valid; deploying computing devices within a CI/CD pipeline ecosystem for performing the instrumented testing execution plan; capturing deployment logs; initiating telemetry capture; executing pipeline testing of the workflow based on the instrumented testing execution plan; generating a pipeline deployment information set based on the pipeline testing; and providing the pipeline deployment information set to an orchestrator of a production device ecosystem.

20 Claims, 4 Drawing Sheets

CONTINUOUS INTEGRATION AND CONTINUOUS DELIVERY PIPELINE DATA FOR WORKFLOW DEPLOYMENT

BACKGROUND

Computing devices often exist in complex ecosystems of devices in which data exists and/or is generated. Such data may be used and/or operated on to produce any number of results. Such operations are often performed by workflows that include any number of services, each using any number of applications, modules, etc. It may be advantageous to deploy all or portions of such workflows within certain portions of the ecosystem of devices. However, as the complexity of such an ecosystem increases (e.g., more data, more devices, etc.), it may become difficult to determine where to deploy workflows, and how to efficiently do so once an execution environment is determined. Additionally, prior to receiving a workflow for deployment in a production environment, there is often little or no data available to the one or more entities tasked with deploying the workflow in a device ecosystem on how the workflow might execute within the environment.

SUMMARY

In general, certain embodiments described herein relate to a method for using pipeline data for deploying workflows. The method may include making a first determination that a pipeline testing trigger has occurred for a workflow; decomposing, based on the first determination, a pipeline testing manifest associated with the workflow to obtain a decomposed workflow; generating a pipeline testing execution plan using the decomposed workflow; adding pipeline testing instrumentation to the pipeline testing execution plan to obtain an instrumented pipeline testing execution plan; making a second determination that the instrumented pipeline testing execution plan is valid; deploying a plurality of computing devices within a continuous integration and continuous delivery (CI/CD) pipeline ecosystem for performing the instrumented pipeline testing execution plan; capturing deployment logs based on the deploying of the plurality of computing devices; initiating telemetry capture for the performing of the instrumented pipeline testing execution plan; executing pipeline testing of the workflow based on the instrumented pipeline testing execution plan; generating a pipeline deployment information set based on the executing of the pipeline testing; and providing the pipeline deployment information set to an orchestrator of a production device ecosystem.

In general, certain embodiments described herein relate to a non-transitory computer readable medium that includes computer readable program code, which when executed by a computer processor enables the computer processor to perform a method for using pipeline data for deploying workflows. The method may include making a first determination that a pipeline testing trigger has occurred for a workflow; decomposing, based on the first determination, a pipeline testing manifest associated with the workflow to obtain a decomposed workflow; generating a pipeline testing execution plan using the decomposed workflow; adding pipeline testing instrumentation to the pipeline testing execution plan to obtain an instrumented pipeline testing execution plan; making a second determination that the instrumented pipeline testing execution plan is valid; deploying a plurality of computing devices within a continuous integration and continuous delivery (CI/CD) pipeline ecosystem for performing the instrumented pipeline testing execution plan; capturing deployment logs based on the deploying of the plurality of computing devices; initiating telemetry capture for the performing of the instrumented pipeline testing execution plan; executing pipeline testing of the workflow based on the instrumented pipeline testing execution plan; generating a pipeline deployment information set based on the executing of the pipeline testing; and providing the pipeline deployment information set to an orchestrator of a production device ecosystem.

In general, certain embodiments described herein relate to a system for using pipeline data for deploying workflows. The system may include a pipeline deployment information device, executing on a processor comprising circuitry. The pipeline deployment information device may be configured to make a first determination that a pipeline testing trigger has occurred for a workflow; decompose, based on the first determination, a pipeline testing manifest associated with the workflow to obtain a decomposed workflow; generate a pipeline testing execution plan using the decomposed workflow; add pipeline testing instrumentation to the pipeline testing execution plan to obtain an instrumented pipeline testing execution plan; make a second determination that the instrumented pipeline testing execution plan is valid; deploy a plurality of computing devices within a continuous integration and continuous delivery (CI/CD) pipeline ecosystem for performing the instrumented pipeline testing execution plan; capture deployment logs based on the deploying of the plurality of computing devices; initiate telemetry capture for the performing of the instrumented pipeline testing execution plan; execute pipeline testing of the workflow based on the instrumented pipeline testing execution plan; generate a pipeline deployment information set based on the executing of the pipeline testing; and provide the pipeline deployment information set to an orchestrator of a production device ecosystem.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
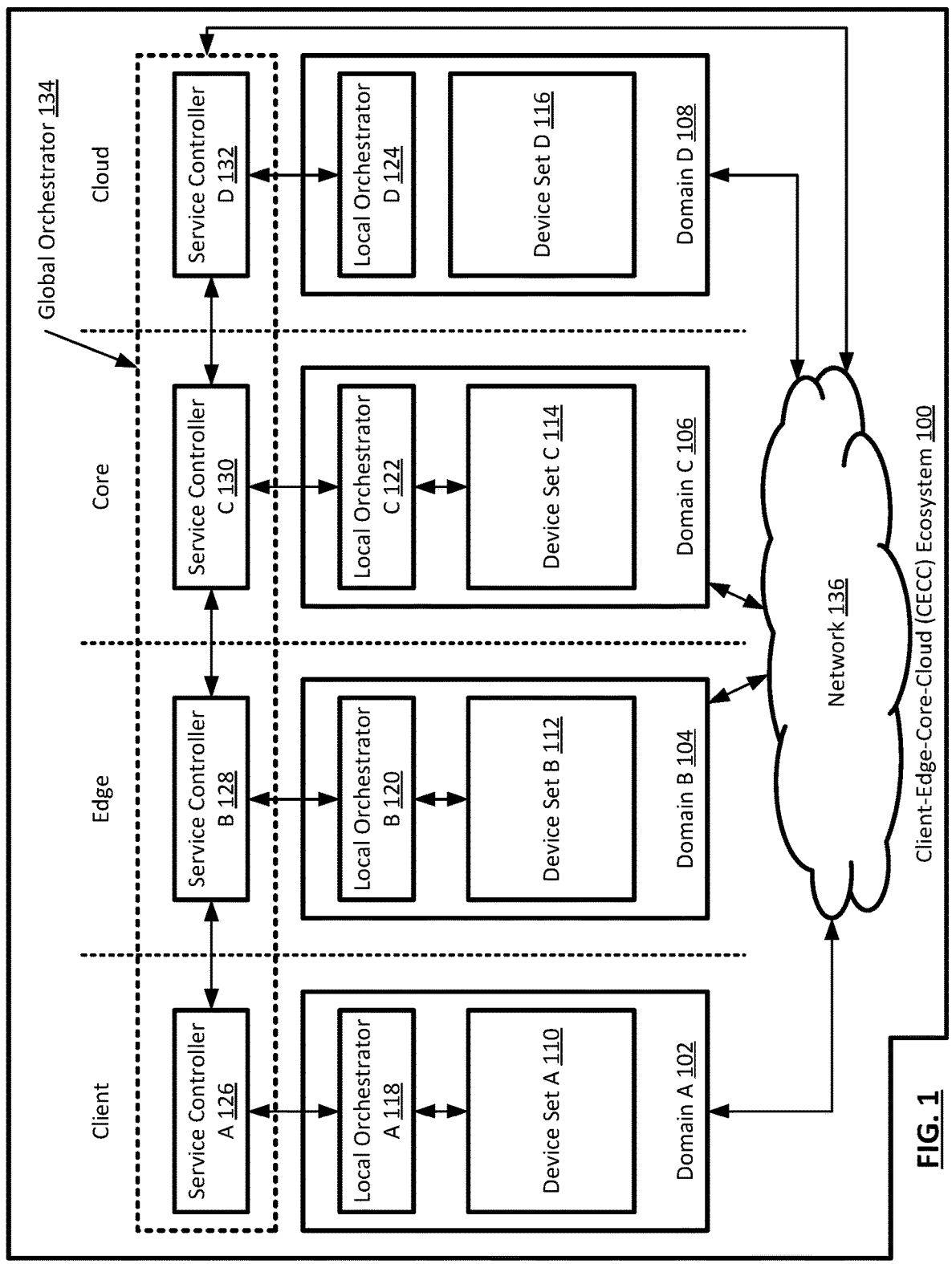
FIG. 1 shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for provisioning workflows, or portions thereof, in a device ecosystem using information obtained from a continuous integration and continuous delivery (CI/CD) pipeline systems. In one or more embodiments, a CI/CD pipeline is any one or more computing devices where all or any portion of a workflow is executed, tested, etc. prior to deployment of the workload in a production device ecosystem.

In one or more embodiments, a CI/CD pipeline is a software and product development environment where software may be designed, written, compiled, and executed. More specifically, as used herein, a CI/CD pipeline ecosystem is a set of any number of computing devices used when developing a workflow for execution to generate a CI/CD pipeline execution plan, to deploy workflow or portions thereof into CI/CD pipeline ecosystem devices for testing and execution, and to collect various items of information generated during the testing and execution.

The concepts of CI/CD are becoming more common when delivering applications (e.g., workflows) to cloud infrastructure or other relevant workflow deployment environments. In one or more embodiments, information contained within these ecosystems exists that may help optimize infrastructure (e.g., a cloud stack). Such information may include, but is not limited to, ecosystem architecture concepts, information related to requirements for a workflow, interaction patterns between workflow portions within a workflow and with external services, information related to computing resource use by the workflow, or any portion therein during execution, testing results, and performance metrics during workflow execution, etc. In one or more embodiments, any or all such information may be collected from the CI/CD pipeline ecosystem, and provided to global and/or local orchestrators of a production device ecosystem. In one or more embodiments, the global and/or local orchestrators use the information obtained from the CI/CD pipeline ecosystem to help facilitate, at least in part, more efficient and optimal deployment of a workflow within the production device ecosystem.

In one or more embodiments, as device ecosystems grow in size and complexity (e.g., from client to edge to core to cloud), connecting more diverse devices generating more data, the need to be able to inventory and characterize the connectivity is required in order to support complex workflows that may span any number of domains. In one or more embodiments, as the overall application workflow extends within a device ecosystem to capture, process, analyze, or otherwise use data, fitting the services of the application workflow to the capabilities of the various portions of the ecosystem is required. Such fitting may allow for meeting the service level objective (SLO) for the application workflow and the services used in building the workflow, which may be achieved by provisioning work to portions of the ecosystem having necessary capabilities, capacity, and/or data, using mapping relationships between devices. In one or more embodiments, the device ecosystem from client to edge to core to cloud can be mapped into a graph, database, etc., with elements discovered and relationships established and maintained for queries made to determine where one or more portions of a given workflow could possibly be deployed.

To achieve such goals, in one or more embodiments, a global orchestrator receives, from local orchestrators associated with respective device domains, capabilities and capacity information. Such capability and capacity information, along with information related to connectivity between different portions of the ecosystem, may be included, by the global orchestrator, in a graph or other data construct representing the device ecosystem.

In one or more embodiments, each local orchestrator in an ecosystem obtains and stores more detailed information of the device set of the domain with which it is associated, including, but not limited to, details related to topology, connection bandwidth, processors, memory, storage, data stored in storage, network configuration, domain accelerators (e.g., graphics processing units (GPUs)), deployed operating systems, programs and applications, etc. In one or more embodiments, the more detailed information kept by the various local orchestrators represents a different layer of the graph or database of the ecosystem. Thus, in one or more embodiments, the global orchestrator of an ecosystem has a map of the capabilities and capacity of the various portions of the ecosystem, while the underlying local orchestrators have a more detailed map of the actual resources within a given domain device set with which they are associated. In one or more embodiments, the global orchestrator optimizes deployment of workflows from a global perspective, and local orchestrators further optimize deployment of workflow portions provided to them by the global orchestrator.

In one or more embodiments, a local orchestrator, associated with a domain of devices, determines the local topology in the domain, and collects and aggregates information about the devices in the domain. Such information may include, but is not limited to, compute resources, memory resources, accelerator resources, software resources, operating systems, network information, storage information, resource capacity information (e.g., based at least in part on on-going execution of various workloads), etc. In one or more embodiments, the local orchestrator maintains a machine learning algorithm, such as a classifier, to determine, based on the aforementioned local domain information, what capabilities the domain is suited to perform. In one or more embodiments, the capabilities for the domain, and its capacity, are communicated from the local orchestrator to the global orchestrator. In one or more embodiments, the global orchestrator receives such information from any number of local orchestrators associated with any number of domains in a device ecosystem.

In one or more embodiments, a global orchestrator may receive a request to execute a workflow (e.g., from a console accessing the global orchestrator). In one or more embodiments, the global orchestrator decomposes the workflow into workflow portions, such as services required, data needed, etc., and uses the global graph of the ecosystem to determine which local orchestrators of various domains within the device ecosystem should receive one or more portions of the workflow. In one or more embodiments, when making such a determination, the global orchestrator uses information obtained from a CI/CD pipeline. In one or more embodiments, such information is generated during testing and execution of the workflow, or portions thereof, in the CI/CD pipeline prior to deploying the workflow for execution in a production device ecosystem. In one or more embodiments, in addition to the CI/CD pipeline information being used by the global orchestrator when determining where to deploy workflow portions within a device ecosystem, the CI/CD pipeline information may also be provided to local orchestrators of domains within the device ecosystem for use in locally deploying workflow portions within the domain.

FIG. 1 shows a diagram of a system in accordance with one or more embodiments described herein. The system may include client-edge-core-cloud (CECC) ecosystem (100). CECC ecosystem (100) may include domain A (102), domain B (104) domain C (106) and domain D (108). Domain A (102) may include local orchestrator A (118) and device set A (110). Domain B (104) may include local orchestrator B (120) and device set B (112). Domain C (106) may include local orchestrator C (122) and device set C (114). Domain D (108) may include local orchestrator D (124) and device set D (116). Domain A (102) may be operatively connected to (or include) service controller A (126). Domain B (104) may be operatively connected to (or include) service controller B (128). Domain C (106) may be operatively connected to (or include) service controller C (130). Domain D (108) may be operatively connected to (or include) service controller D (132). Service controller A (126), service controller B (128), service controller C (130), and service controller D (132) may collectively be global orchestrator (134). All or any portion of any device or set of devices in CECC ecosystem (100) may be operatively connected to any other device or set of devices via network (136). Each of these components is described below.

In one or more embodiments, CECC ecosystem (100) is a production device ecosystem (discussed further in the description of FIG. 2, below). In one or more embodiments, CECC ecosystem (100) may be considered a hierarchy of ecosystem portions. In the example embodiment shown in FIG. 1, CECC ecosystem (100) includes a client portion, an edge portion, a core portion, and a cloud portion. However, CECC ecosystem (100) is not limited to the example arrangement shown in FIG. 1. CECC ecosystem (100) may have any number of client portions, each operatively connected to any number of edge portions, which may, in turn, be operatively connected to any number of core portions, which may, in turn, be connected to one or more cloud portions. Additionally, a given CECC ecosystem (100) may have more or fewer layers without departing from the scope of embodiments described herein. For example, the client portion may be operatively connected to the core portion, or the cloud portion, without an intervening edge portion. As another example, there may be a far edge portion and a near edge portion of ecosystem (100). One of ordinary skill in the art will recognize that there are many possible arrangements of CECC ecosystem (100) other than the example hierarchy shown in FIG. 1.

In one or more embodiments, domain A (100) is a portion of CECC ecosystem (100) in the client portion of CECC ecosystem (100). Similarly, domain B (104), domain C (106) and domain D (108) are in the edge portion, the core portion, and the cloud portion, respectively.

In one or more embodiments, domain A (102) includes device set A (110). In one or more embodiments, device set A (110) includes any number of computing devices (not shown). In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), a controller, a sensor, and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices may be operatively connected to other computing devices of device set A (110) in any way, thereby creating any topology of computing devices within device set A (110). In one or more embodiments, one or more computing devices in device set A (110) may be operatively connected to any one or more devices in any other portion of CECC ecosystem (100). Such operative connections may be all or part of a network (136). A network (e.g., network (136)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1, network (136) may include any number of devices within any device set (e.g., 110, 112, 114, 116) of CECC ecosystem (100), as well as devices external to, or between, such portions of CECC ecosystem (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within CECC ecosystem (100), such as, for example, the global orchestrator and/or local orchestrators (discussed below).

In one or more embodiments, any or all of the devices in device set A (110) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

In one or more embodiments, domain A (102) also includes local orchestrator A (118). In one or more embodiments, local orchestrator A (118) is any computing device (described above), or any portion of any computing device. In one or more embodiments, local orchestrator A (118) executes as a service. In one or more embodiments, local orchestrator A (118) includes functionality to discover details of device set A (110). Such details include, but are not limited to: how devices are connected; what resources a device has (e.g., processors, memory, storage, networking, accelerators, etc.), how much capacity of a device or set of devices is used; what operating systems are executing on devices; how many virtual machines or other virtual computing instances exist; what data exists and where it is located; and/or any other information about devices in device set A (110).

In one or more embodiments, based on the information discovered by local orchestrator A (118) about device set A (110), local orchestrator A determines what capabilities device set A (110), or any portion thereof, may perform. In one or more embodiments, a capability is any one or more actions, operations, functionality, stored data, ability to obtain data from any number of data sources, compute resources to perform certain tasks, etc. Examples of capabilities include, but are not limited to, inference, training for machine learning, implementing in-memory databases, having a particular dataset (e.g., video and images from stores of a certain company in a certain region of the country), performing classification, data analysis, etc. Embodiments described herein are not limited to the aforementioned examples. In one or more embodiments, local orchestrator A (118) uses one or more machine learning algorithms (e.g., a classifier) in order to determine the capabilities that a domain has based on the information discovered about devices in the domain. In one or more embodiments, local orchestrator B (120), local orchestrator C (122), and local orchestrator D (124) are also computing devices (described above), and perform functionality similar to that of local orchestrator A (118) for their respective domains (i.e., domain B (104), domain C (106), and domain D (108)).

In one or more embodiments, each domain (e.g., 102, 104, 106, 108) in CECC ecosystem (100) includes a device set (e.g., 110, 112, 114, 116) and a local orchestrator (e.g., 118, 120, 122, 124). In one or more embodiments, each device set is a set of computing devices, such as is discussed above in the description of device set A. However, the set of computing devices in different device sets may be different, and may be particular to the portion (e.g., client, edge, cloud, core) of CECC ecosystem (100) that the device set is in. For example, the client portion of CECC ecosystem (100) may include sensors collecting data, controllers controlling the sensors, desktop devices, mobile computing devices, etc. Other data sets may include different computing devices. For example, the edge portion of CECC ecosystem (100) may have a device set that includes servers with more compute ability than devices in the client portion. Similarly, the core portion of CECC ecosystem (100) may include more powerful devices, a greater quantity of more powerful devices, specific architectures of sets of devices for performing certain tasks, etc. Also similarly, the cloud portion of CECC ecosystem (100) may include still more and different devices configured and deployed in different ways that the other portions of CECC ecosystem (100).

Additionally, although not shown in FIG. 1, CECC ecosystem (100) may be arranged in a hierarchy. For example, a single cloud portion may be operatively connected to any number of core portions, each of which may be connected to any number of edge portions, each of which may be connected to any number of client portions. The particular device set (110, 112, 114, 116) in any given portion of CECC ecosystem (100) may determine what capabilities the domain (102, 104, 106, 108) in which the device set exists is suited to perform, which is known to and/or determined by the local orchestrator for the domain (102, 104, 106, 108).

In one or more embodiments, each local orchestrator (118, 120, 122, 124) is operatively connected to a respective service controller (126, 128, 130, 132). Any portion of CECC ecosystem (100) may include any number of service controllers (126, 128, 130, 132), each of which may be operatively connected to any number of local orchestrators (118, 120, 122, 124) in any number of domains (102, 104, 106, 108) in a given ecosystem portion (e.g., client, edge, core, cloud). In one or more embodiments, each service controller (126, 128, 130, 132) is also operatively connected to the other service controllers (126, 128, 130, 132) in CECC ecosystem (100). In one or more embodiments, the operatively connected service controllers (126, 128, 130, 132) of CECC ecosystem (100) form global orchestrator (134) for CECC ecosystem (100). Although FIG. 1 shows global orchestrator (134) as a collection of services controllers, the global orchestrator may instead be a single device, or any quantity of devices, without departing from the scope of embodiments described herein.

In one or more embodiments, global orchestrator (134) functions as a distributed service for deploying workflows within CECC ecosystem (100). In one or more embodiments, any service controller (126, 128, 130, 132) of global orchestrator (134) may be accessed to request provisioning of a workflow. In one or more embodiments, each service controller (126, 128, 130, 132) receives, from operatively connected local orchestrators within the same portion of CECC (100), information about what capabilities underlying device sets of a domain can perform, how much capacity is available on the device set within a given domain (which may be updated on any update schedule), and/or any other information or metadata that may be useful to determine whether a portion of a workflow should be or can be provisioned within a given domain.

In one or more embodiments, each service controller of global orchestrator (134) also shares the information with each other service controller of global orchestrator (134). Collectively, the shared information may be organized as a graph, or database, or any other data construct capable of storing such information, and of being queried to find such information. Such a graph or database may be a distributed data construct shared between the collection of service controllers of global orchestrator (134).

While FIG. 1 shows a configuration of components, other configurations may be used without departing from the scope of embodiments described herein. Accordingly, embodiments disclosed herein should not be limited to the configuration of components shown in FIG. 1.

Figure 2:
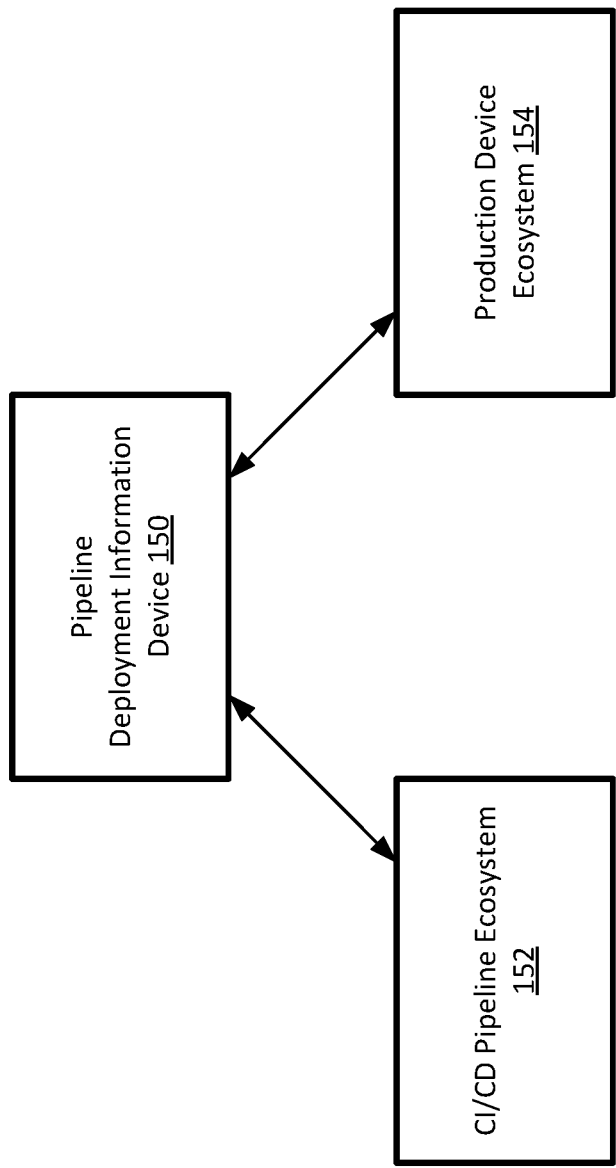
FIG. 2 shows a diagram of a system in accordance with one or more embodiments of the invention.

FIG. 2 shows a diagram of a system in accordance with one or more embodiments described herein. The system may include a pipeline deployment information device (150), a CI/CD pipeline ecosystem (152), and a production device ecosystem (154). Each of these components is described below.

In one or more embodiments, a production device ecosystem (154) is any device or set of devices in which a workflow may be deployed for execution. One non-limiting example of a production device ecosystem (154) is CECC ecosystem (100) shown in FIG. 1 and described above.

In one or more embodiments, a CI/CD pipeline ecosystem is any one or more computing devices (described above) in which a workflow, or any portions thereof, is tested and/or executed before the workflow is deployed into production device ecosystem (154). As an example, CI/CD pipeline ecosystem (152) may include any number of computing devices, with some of the computing devices used for designing and performing an execution plan for testing a workflow, and portions thereof, other computing devices used to actually execute and test the workflow or portions thereof, and computing devices for monitoring the testing and execution of the workflow for capturing data and information related thereto. In one or more embodiments, at least some portion of CI/CD pipeline ecosystem (152) is a virtualization environment, such as, for example, a system of Kubernetes containers.

In one or more embodiments, the system includes pipeline deployment information device (150). In one or more embodiments, pipeline deployment information device (150) is one or more computing devices (described above). In one or more embodiments, pipeline deployment information device (150) is operatively connected to one or more devices of CI/CD pipeline ecosystem (152) and one or more devices of production device ecosystem (154). In one or more embodiments, pipeline deployment information device (150) is operatively connected to one or more global orchestrators and one or more local orchestrators of production device ecosystem (154). In one or more embodiments, pipeline deployment information device (150) includes functionality to aggregate information related to execution and/or testing of a workflow, or portions thereof, and providing such CI/CD pipeline information to global orchestrators and/or local orchestrators of production device ecosystem (154). Functionality performed by pipeline deployment information device (150) is discussed further in the description of FIG. 3, below.

While FIG. 2 shows a configuration of components, other configurations may be used without departing from the scope of embodiments described herein. Accordingly, embodiments disclosed herein should not be limited to the configuration of components shown in FIG. 2.

Figure 3:
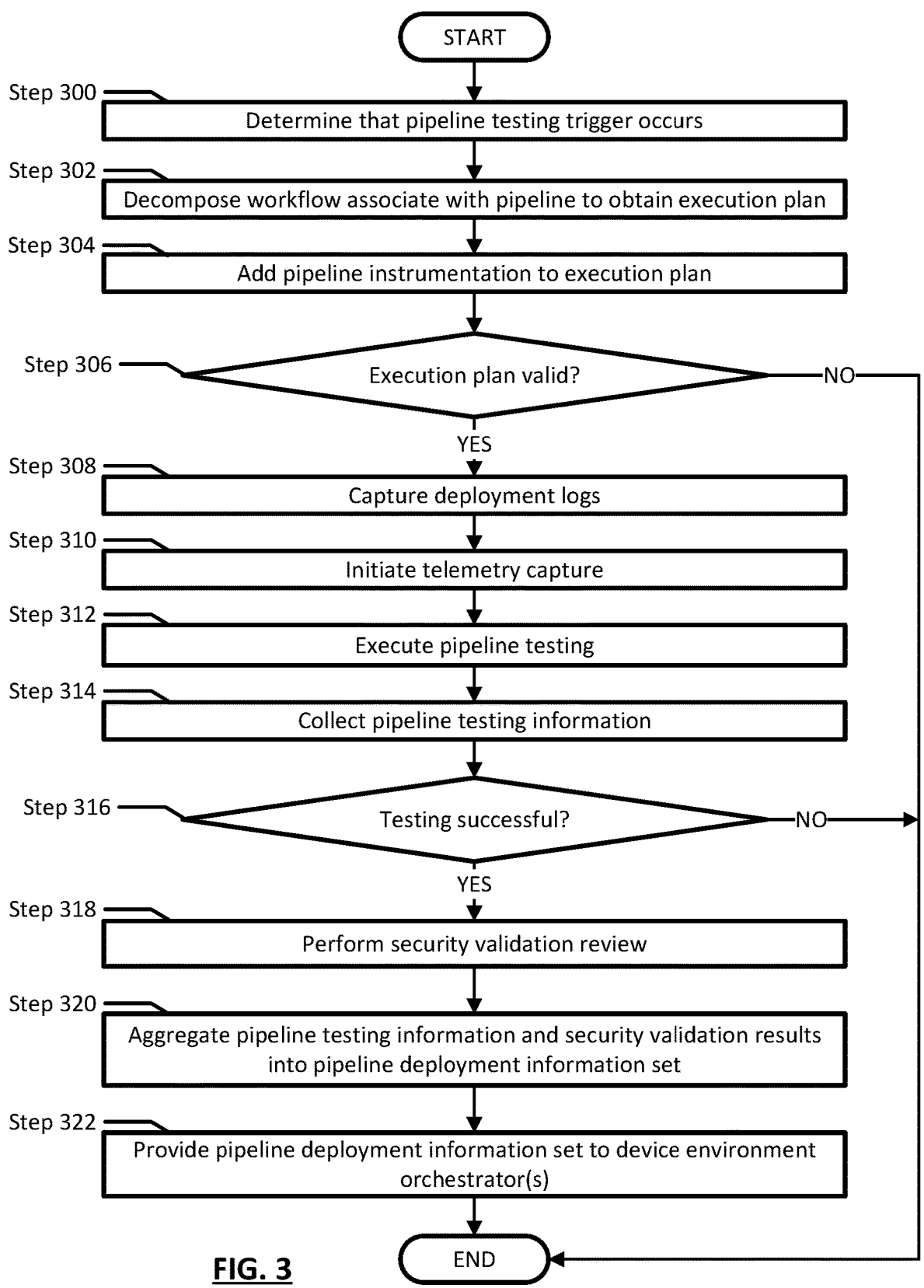
FIG. 3 shows a flowchart in accordance with one or more embodiments of the invention.

FIG. 3 shows a flowchart describing a method for obtaining information from a CI/CD pipeline ecosystem about a workflow, and providing the information to orchestrators of a production device ecosystem in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, a determination is made that a workflow testing trigger has occurred. In one or more embodiments, the trigger is a request to test and/or otherwise execute a workflow prior to deployment of the workflow into a production device system. In one or more embodiments, the trigger is completion of, or an update of, any one or more software applications to be executed as part of the workflow. In one or more embodiments, a trigger may be associated with the planned test and/or execution of an entire workflow within a CI/CD pipeline ecosystem. In one or more embodiments, a trigger is associated with any portion of a workflow to be executed within a CI/CD pipeline ecosystem.

In Step 302, the workflow, or any portion thereof, for which execution and/or testing was requested in Step 300 is decomposed. In one or more embodiments, decomposing a workflow, or any portion thereof, for testing and/or execution in a CI/CD pipeline ecosystem includes identifying one or more services, applications, operations, etc. to be tested and/or executed, identifying any number of connections between computing devices (e.g., operative connections that facilitate output of one computing device that is used for input to another computing device), identifying any requirements for execution (e.g., compute resources required, latency requirements, etc.). In one or more embodiments, the workflow is decomposed to obtain an execution plan. In one or more embodiments, an execution plan, as used herein, is any plan for testing and/or execution of the workflow, or any one or more portions thereof, in the CI/CD pipeline ecosystem.

In Step 304, pipeline instrumentation is added to the execution plan. In one or more embodiments, pipeline instrumentation is any tools, containers, services, etc. that will be deployed, configured, used, etc. during testing and execution of the workflow in the CI/CD pipeline ecosystem. As an example, any number of sidecar containers might be planned for use during workflow testing and/or execution to monitor aspects of the workflow execution in the CI/CD pipeline ecosystem, any monitoring services (e.g., Prometheus for Kubernetes) may be configured to capture telemetry data, etc.

In Step 306, a determination is made as to whether the execution plan is valid. Determining an execution plan is valid may include, but is not limited to, determining that sufficient resources exist in the CI/CD pipeline ecosystem environment to execute and/or test the planned workflow execution, determining that all required software is available and has compiled successfully, etc. In one or more embodiments, if the execution plan is not determined to be valid, the method ends, and the failure is logged and/or reported to one or more relevant entities, who may take remedial actions to address the cause of failure. In one or more embodiments, if the execution plan is determined to be valid, then the method proceeds to Step 308.

In Step 308, deployment logs are captured. In one or more embodiments, deployment logs are any information related to the deployment of the workflow, or any portion thereof, in the CI/CD pipeline ecosystem. Examples include, but are not limited to, how many containers or virtual machines (VMs) were created, what compute resources (e.g., CPU, memory, storage, networking) were configured for the containers or VMs, what services are to be deployed, how the various computing devices are interconnected, network configuration, storage device access, how many container or VM hosts are used, etc. Other types of information may be part of deployment logs without departing from the scope of embodiments described herein.

In Step 310, telemetry capture is initiated for the testing and/or execution of the workflow or portions thereof. In one or more embodiments, telemetry capture includes starting any logging mechanism on all or any portion of the computing devices, sidecar containers, monitoring services, etc. used during the testing and/or execution. Telemetry data may include recording which devices communicated with which other devices, data accesses, network usage, storage read/writes, performance metrics measuring compute resource usage, etc. In one or more embodiments, the various mechanisms and techniques for telemetry capture are performed during all or any portion of the execution and testing to capture information related thereto. In one or more embodiments, the telemetry capture is initiated prior to the actual execution of the workflow in the CI/CD pipeline ecosystem. As an example, initiating telemetry capture prior to the execution may prepare relevant telemetry capture for containers that only exist for short periods of time, which might be missed if telemetry capture had not already been initiated.

In Step 312, the workflow or portions thereof is executed in the CI/CD pipeline ecosystem. In one or more embodiments, executing the workflow includes performing any services, executing any applications, performing any operations, generating, transforming, consuming, etc. any data, producing results, etc.

In Step 314, pipeline testing information is collected. In one or more embodiments, collecting pipeline testing information includes aggregating all of the deployment logs, the testing and execution logs, the various telemetry data, etc. that were generated during deployment and/or execution of the workflow in the CI/CD pipeline ecosystem, such as, for example, telemetry data, behavior patterns, communication patterns, dependencies, etc. In one or more embodiments, collecting the pipeline testing information includes generating an identifier of the workflow testing and execution, and associating the identifier with the aggregated pipeline testing information. In one or more embodiments, the identifier is any information item that identifies the workflow with which the execution and/or testing is associated, and may also include a version number that uniquely identifies the particular testing and/or execution run that generated the pipeline testing information.

In Step 316, a determination is made as to whether the testing was successful. In one or more embodiments, successful testing includes successful completion of the execution and testing with no errors that prevent the workflow from being deployed in a production device environment. In one or more embodiments, if the testing was not successful, the method ends, and the failure is reported to one or more relevant entities, who may perform remedial actions to correct the one or more causes for the failure. In one or more embodiments, if the testing was successful, the method proceeds to Step 318.

In Step 318, a security validation review is performed. In one or more embodiments, a security validation review is a review of the pipeline testing information to determine if any potential security issues exist that may also happen during execution of the workflow in the production device ecosystem. In one or more embodiments, a security validation review includes techniques such as template comparisons, input and configuration validation, behavioral analysis, and intent. Other techniques may be used when performing a security validation review without departing from the scope of embodiments described herein. In one or more embodiments, a security validation review determines any possible security issue. Examples of such security issues include, but are not limited to, information leakage, inadvertent information exposure, devices communicating or attempting to communicate with other devices outside the planned communications for the workflow, etc. In one or more embodiments, the security validation review is, at least in part, an automated review process.

In Step 320, the pipeline testing information collected in Step 314, and the results of the security validation review are aggregated into a pipeline deployment information set. The pipeline deployment information set may be any form or structure of data capable of including all of the pipeline testing information and security validation review results.

In Step 322, the pipeline deployment information set is provided to one or more global orchestrators and/or one or more local orchestrators of the production device environment in which the workflow is to be deployed. The pipeline deployment information set may be provided to the one or more orchestrators using any technique for transmitting information between computing devices. For example, the pipeline deployment information set may be sent to the orchestrators as a series of network packets over network connections between a pipeline information device and the one or more orchestrators. In one or more embodiments, the pipeline deployment information set is provided separately to each orchestrator. In other embodiments, the pipeline deployment information set is provided to a subset of one or more orchestrators, which further disseminate the pipeline deployment information set to other orchestrators.

In one or more embodiments, although not shown in FIG. 3, the pipeline deployment information set is used by the orchestrators when determining how to deploy the workflow in the production device ecosystem. In one or more embodiments, global orchestrators use the pipeline deployment information set to help determine one or more domains in which to deploy one or more portions of the workflow. In one or more embodiments, local orchestrators use the pipeline deployment information set to help determine how to efficiently and optimally compose systems of devices within their respective domains for executing workflow portions received from a global orchestrator.

Example Use Case

The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that a real-world use of embodiments described herein may be a device ecosystem organized and interconnected in any manner, that any number of different workflows to achieve any number of different results may be deployed in such an ecosystem of devices, and that any amount of CI/CD pipeline testing of all or any portion of a workflow may be used to obtain information for use in deploying the workflow in a production device environment.

Consider a scenario in which a retail store has cameras deployed in the store on mobile robots to monitor inventory levels of items to be sold in the store. Based on the images, the store wants to have orders placed when inventory of the monitored items drops to a certain level, and wants to use the image data obtained by the robots to trigger the orders. To achieve this goal, the store needs a machine learning algorithm that has been trained to recognize when images of the inventory indicate that the inventory has reached the point of triggering the orders, and that has the ability to execute the trained algorithm using the images obtained by the cameras on the robots.

In such a scenario, the store will utilize a CECC ecosystem, which includes many domains, including domain A in a client portion of the ecosystem, domain B in an edge portion of the ecosystem, domain C in a core portion of the ecosystem, and domain D in a cloud portion of the ecosystem.

The client portion of the ecosystem exists in the store as cameras on the robots, and the associated computing devices for capturing the inventory images. The edge portion of the ecosystem also exists at the store, and includes computing devices for collating the data and computing devices for executing the trained ML algorithm. The store is part of a national chain that has a number of data centers across the country that collectively make up the core portion of the store chain's device ecosystem. Domain C is in a data center of the core portion that is located in the same region as the store. The cloud portion of the ecosystem is used for storing information relevant to the chain of stores, and for historical purposes, as well as being the location from which all orders for the store chain are made.

When the store seeks to implement (or update) the new inventory management scheme, it first submits the workflow for the workflow to a CI/CD pipeline as a pipeline manifest file. Next, the pipeline manifest file is decomposed to identify the services, applications, operations, data, interconnections, etc. therein that are to be tested in the CI/CD pipeline ecosystem. Next, an execution plan is created, and relevant instrumentation is added to the execution plan where appropriate.

Next, the execution plan is validated to determine that all relevant infrastructure and resources are available for the testing of the workflow. In this scenario, the execution plan is successfully validated. Accordingly, deployment of the workflow in the CI/CD pipeline begins. The workflow is to be deployed using a number of Kubernetes containers and other infrastructure to simulate the CECC environment into which the store plans to deploy the workflow. The deployment logs are collected that capture details of the configuration of the various containers and other infrastructure. Next, telemetry capture is started, which includes initiating logging, configuring Kubernetes' Prometheus tool, etc. Next, the testing of the workflow is executed, and the various logs, telemetry data, interaction patterns (internal to workflow and external to/from workflow), behavior patterns, communication patterns, performance metrics, etc. are collected.

Next, a security validation review is performed. In this scenario, it is determined that no significant security vulnerabilities exist. Next, the pipeline testing information, deployment logs, and security validation review results are aggregated into a pipeline deployment information set.

Next, the pipeline deployment information set is provided to the global orchestrator and the local orchestrators of the CECC ecosystem that the store intends to use to execute the workflow. The global orchestrator uses information therein to, at least in part, determine where in the CECC ecosystem to deploy the workflow portions. The local orchestrators use portions of the pipeline deployment information set to determine, at least in part, how to compose the devices in their respective domains for executing workflow portions provided by the global orchestrator.

End of Example

Figure 4:
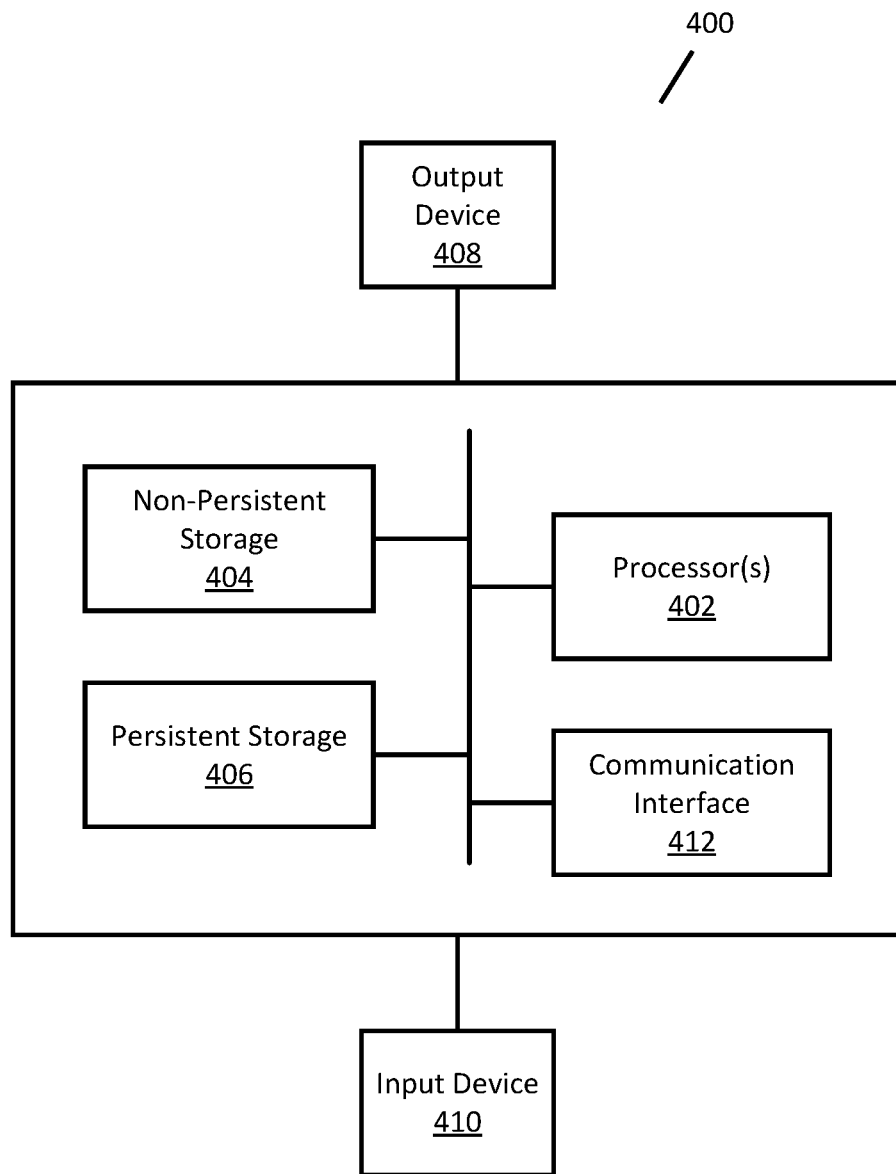
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

In one or more embodiments, embodiments described herein use data (telemetry, behavior patterns, communication patterns, dependencies, etc.) to build a graph of interactions and communication paths that each identified service or dependency in a workflow manifest, so that it may be placed or scheduled in part of the desired ecosystem that best meets the higher level SLOs when moving into a production environment. The telemetry, deployment, and behavioral information gathered from the CI/CD system may be used to provide insights into the deployment directly from the CI/CD pipeline. In one or more embodiments, having such information helps enable initial placement, orchestration, and/or choreography to deploy the workflow on the most optimized resources or systems to start with, potentially minimizing movement afterwards.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for using pipeline data for deploying workflows, the method comprising:
   making a first determination that a pipeline testing trigger has occurred for a workflow;
   decomposing, based on the first determination, a pipeline testing manifest associated with the workflow to obtain a decomposed workflow;
   generating a pipeline testing execution plan using the decomposed workflow;
   adding pipeline testing instrumentation to the pipeline testing execution plan to obtain an instrumented pipeline testing execution plan;
   making a second determination that the instrumented pipeline testing execution plan is valid;
   deploying a plurality of computing devices within a continuous integration and continuous delivery (CI/CD) pipeline ecosystem for performing the instrumented pipeline testing execution plan;
   capturing deployment logs based on the deploying of the plurality of computing devices;
   initiating telemetry capture for the performing of the instrumented pipeline testing execution plan;
   executing pipeline testing of the workflow based on the instrumented pipeline testing execution plan;
   generating a pipeline deployment information set based on the executing of the pipeline testing; and
   providing the pipeline deployment information set to an orchestrator of a production device ecosystem.

2. The method of claim 1, wherein the pipeline testing trigger is one selected from a group consisting of a pipeline testing request and a workflow software update.

3. The method of claim 1, wherein the telemetry capture is initiated before the executing of the pipeline testing begins.

4. The method of claim 1, wherein the pipeline deployment information set comprises pipeline testing information and deployment logs.

5. The method of claim 1, further comprising, before generating the pipeline deployment information set, performing a security validation review using pipeline testing information obtained during the executing of the pipeline testing.

6. The method of claim 5, wherein the pipeline deployment information set comprises results of the security validation review.

7. The method of claim 1, wherein the orchestrator is a global orchestrator, and the method further comprises providing the pipeline deployment information set to a local orchestrator of the production device ecosystem.

8. The method of claim 7, wherein the global orchestrator uses the pipeline deployment information set to determine where in the production device ecosystem to deploy a plurality of workflow portions of the workflow, and the local orchestrator uses the pipeline deployment information set to compose a set of devices for executing a workflow portion of the plurality of workflow portions.

9. A non-transitory computer readable medium comprising computer readable program code, which when executed by a computer processor enables the computer processor to perform a method for using pipeline data for deploying workflows, the method comprising:
   making a first determination that a pipeline testing trigger has occurred for a workflow;
   decomposing, based on the first determination, a pipeline testing manifest associated with the workflow to obtain a decomposed workflow;
   generating a pipeline testing execution plan using the decomposed workflow;
   adding pipeline testing instrumentation to the pipeline testing execution plan to obtain an instrumented pipeline testing execution plan;
   making a second determination that the instrumented pipeline testing execution plan is valid;
   deploying a plurality of computing devices within a continuous integration and continuous delivery (CI/CD) pipeline ecosystem for performing the instrumented pipeline testing execution plan;
   capturing deployment logs based on the deploying of the plurality of computing devices;
   initiating telemetry capture for the performing of the instrumented pipeline testing execution plan;
   executing pipeline testing of the workflow based on the instrumented pipeline testing execution plan;
   generating a pipeline deployment information set based on the executing of the pipeline testing; and
   providing the pipeline deployment information set to an orchestrator of a production device ecosystem.

10. The non-transitory computer readable medium of claim 9, wherein the pipeline testing trigger is one selected from a group consisting of a pipeline testing request and a workflow software update.

11. The non-transitory computer readable medium of claim 9, wherein the telemetry capture is initiated before the executing of the pipeline testing begins.

12. The non-transitory computer readable medium of claim 9, wherein the pipeline deployment information set comprises pipeline testing information and deployment logs.

13. The non-transitory computer readable medium of claim 9, wherein the method performed by executing the computer readable program code further comprises, before generating the pipeline deployment information set, performing a security validation review using pipeline testing information obtained during the executing of the pipeline testing.

14. The non-transitory computer readable medium of claim 13, wherein the pipeline deployment information set comprises results of the security validation review.

15. The non-transitory computer readable medium of claim 9, wherein the orchestrator is a global orchestrator, and the method further comprises providing the pipeline deployment information set to a local orchestrator of the production device ecosystem.

16. The non-transitory computer readable medium of claim 15, wherein the global orchestrator uses the pipeline deployment information set to determine where in the production device ecosystem to deploy a plurality of workflow portions of the workflow, and the local orchestrator uses the pipeline deployment information set to compose a set of devices for executing a workflow portion of the plurality of workflow portions.

17. A system for using pipeline data for deploying workflows, the system comprising:
   a pipeline deployment information device, executing on a processor comprising circuitry, and configured to:
      make a first determination that a pipeline testing trigger has occurred for a workflow;
      decompose, based on the first determination, a pipeline testing manifest associated with the workflow to obtain a decomposed workflow;
      generate a pipeline testing execution plan using the decomposed workflow;
      add pipeline testing instrumentation to the pipeline testing execution plan to obtain an instrumented pipeline testing execution plan;
      make a second determination that the instrumented pipeline testing execution plan is valid;
      deploy a plurality of computing devices within a continuous integration and continuous delivery (CI/CD) pipeline ecosystem for performing the instrumented pipeline testing execution plan;
      capture deployment logs based on the deploying of the plurality of computing devices;
      initiate telemetry capture for the performing of the instrumented pipeline testing execution plan;
      execute pipeline testing of the workflow based on the instrumented pipeline testing execution plan;
      generate a pipeline deployment information set based on the executing of the pipeline testing; and
      provide the pipeline deployment information set to an orchestrator of a production device ecosystem.

18. The system of claim 17, wherein the telemetry capture is initiated before the executing of the pipeline testing begins.

19. The system of claim 17, wherein the pipeline deployment information set comprises pipeline testing information and deployment logs.

20. The system of claim 17, further comprising, before generating the pipeline deployment information set, performing a security validation review using pipeline testing information obtained during the executing of the pipeline testing, wherein the pipeline deployment information set comprises results of the security validation review.

* * * * *